US008141960B2

(12) United States Patent
Beylerian et al.

(10) Patent No.: US 8,141,960 B2
(45) Date of Patent: Mar. 27, 2012

(54) MOTOR VEHICLE BRAKING ASSEMBLY

(75) Inventors: Bruno Beylerian, Louvres (FR);
Yannick Nen, Arpajon (FR); Etienne Durand, Paris (FR); Nicolas Marlhe, Marly la Ville (FR); Jean-Marc Piel, Livry Gargan (FR); Aleksander Hurwic, Paris (FR)

(73) Assignee: Robert Bosch GmbH, Stuttgart (DE)

( * ) Notice: Subject to any disclaimer, the term of this patent is extended or adjusted under 35 U.S.C. 154(b) by 429 days.

(21) Appl. No.: 12/440,106

(22) PCT Filed: Aug. 28, 2007

(86) PCT No.: PCT/EP2007/058902
§ 371 (c)(1),
(2), (4) Date: Mar. 5, 2009

(87) PCT Pub. No.: WO2008/028840
PCT Pub. Date: Mar. 13, 2008

(65) Prior Publication Data
US 2010/0237688 A1 Sep. 23, 2010

(30) Foreign Application Priority Data

Sep. 8, 2006 (FR) ...................................... 06 07943

(51) Int. Cl.
*B60T 13/68* (2006.01)
(52) U.S. Cl. .................................. 303/113.5; 303/116.1
(58) Field of Classification Search .................... 303/10, 303/11, 113.1–113.5, 116.1, 116.2
See application file for complete search history.

(56) References Cited

U.S. PATENT DOCUMENTS

| 5,511,865 | A | | 4/1996 | Howell | |
|---|---|---|---|---|---|
| 5,620,241 | A | * | 4/1997 | Burgdorf | 303/186 |
| 6,106,081 | A | * | 8/2000 | Isono et al. | 303/188 |
| 6,123,396 | A | * | 9/2000 | Siegel | 303/116.1 |
| 2006/0033383 | A1 | * | 2/2006 | Ohlig et al. | 303/15 |

FOREIGN PATENT DOCUMENTS

| DE | 4014052 A1 | 11/1991 |
|---|---|---|
| GB | 2230578 A | 10/1990 |
| JP | 61-160343 | 7/1986 |

OTHER PUBLICATIONS

PCT/EP2007/058902 International Search Report.

* cited by examiner

*Primary Examiner* — Christopher Schwartz
(74) *Attorney, Agent, or Firm* — Michael Best & Friedrich LLP

(57) ABSTRACT

A vehicle braking assembly comprising a master cylinder (10) with no central valves, a brake fluid reservoir (62) mounted separately from the master cylinder (10), pumps (50) for pressurizing the brake fluid and first solenoid valves (68) in pipes (66) connecting the brake fluid reservoir (62) to the inlets of the pumps (50). According to the invention, a calibrated orifice (76) and a nonreturn valve (78) which are connected in parallel are mounted in these pipes (66).

13 Claims, 4 Drawing Sheets

MOTOR VEHICLE BRAKING ASSEMBLY

BACKGROUND AND SUMMARY OF THE INVENTION

This invention concerns a braking installation for a motor vehicle, said installation comprising a master cylinder controlled by a brake pedal and connected to feed circuits for the wheel brakes, as well as a hydraulic unit comprising brake fluid pressure pumps, these pumps being connected to the wheel-brake feed circuits and controlled by a computer.

In such an installation, braking is controlled primarily by the driver of the vehicle using the brake pedal which is connected to the pistons of the master cylinder by a pneumatic brake booster, the action of the driver on the brake pedal causing the vehicle to brake.

The operation of the brake fluid pressure pumps is controlled by the wheel traction control, wheel antilock and drive stability control computer, the computer controlling both the pumps and solenoid valves assembled in the wheel-brake feed circuits, in order to act selectively on one and/or the other of the wheel brakes of the vehicle.

Furthermore, the document FR 2 645 816 makes reference to a braking system comprising a master cylinder and remote brake fluid reservoir.

In these installations, a brake fluid reservoir is conventionally attached to the master cylinder and communicates with each of its chambers via brake-fluid feed and return conduits, the pistons of the master cylinder being fitted with conduits and brake-fluid valves. This known arrangement has the drawback of permitting travel and increasing the number of components in the master cylinder.

This invention is particularly intended to resolve these drawbacks in the prior art.

It concerns an installation of the type detailed above, whose master cylinder has a structure that is more simple than in the prior art and comprises fewer components and in which the travel is eliminated or at least reduced.

Accordingly, it provides a braking installation for a motor vehicle, comprising a brake fluid reservoir, a master cylinder controlled by a brake pedal and connected to feed circuits for wheel brakes, and a hydraulic unit comprising brake fluid pressure pumps, connected to the wheel-brake feed circuits and controlled by a computer, said installation being characterized in that the brake fluid reservoir is linked to said pumps by the first solenoid valves controlled by the computer and that it is separate from the master cylinder.

Thanks to the invention, it is no longer necessary to provide conduits or valves for brake fluid in the pistons of the master cylinder whose structure is considerably simplified.

This makes it possible to reduce or eliminate travel in the master cylinder and to install the reservoir remotely on the master cylinder, advantageously on the aforementioned hydraulic unit.

The reservoir is linked to the pumps of the hydraulic group directly without passing via the master cylinder, which makes it possible to increase the flow rate of the brake fluid supplying the pumps, to reduce the pressurization time in the wheel-brake feed circuits, and also to reduce the spurious noise related to the transfer of brake fluid to the pumps in the hydraulic unit.

According to another feature of the invention, the second solenoid valves controlled by the computer are assembled in the wheel-brake feed circuits between the master-cylinder outputs and the pump outputs.

This feature makes it possible to isolate the master cylinder of the hydraulic unit during operation of the hydraulic-unit pumps, such that the pressurization of the brake fluid in the wheel-brake feed circuits caused by operation of the pumps, does not affect the master cylinder, thanks to the closure of the second solenoid valves, and consequently it is not felt in the pedal.

These second solenoid valves are open in idle position to enable application of the brakes from the master cylinder and are closed by the computer, when the hydraulic unit is working.

Non-return valves are fitted in parallel on the second solenoid valves to prevent the backflow of brake fluid from the wheel brakes to the master cylinder.

In a first embodiment of the invention, the aforementioned first solenoid valves connect the reservoir to the inlets of the hydraulic-unit pumps.

Potentially, a calibrated orifice and a non-return valve, connected to each other in parallel are assembled in the conduits linking the reservoir to the pump inlets.

In an alternative embodiment of the invention, the first solenoid valves link the reservoir to the pump outputs whose inlets are linked to the reservoir via conduits comprising non-return valves preventing the passage of brake fluid towards the reservoir.

BRIEF DESCRIPTION OF THE DRAWINGS

The invention will be better understood and further features, details and advantages thereof will become clearer from the description below, given by way of an example with reference to the attached drawings, in which.

DETAILED DESCRIPTION

Figure 1:
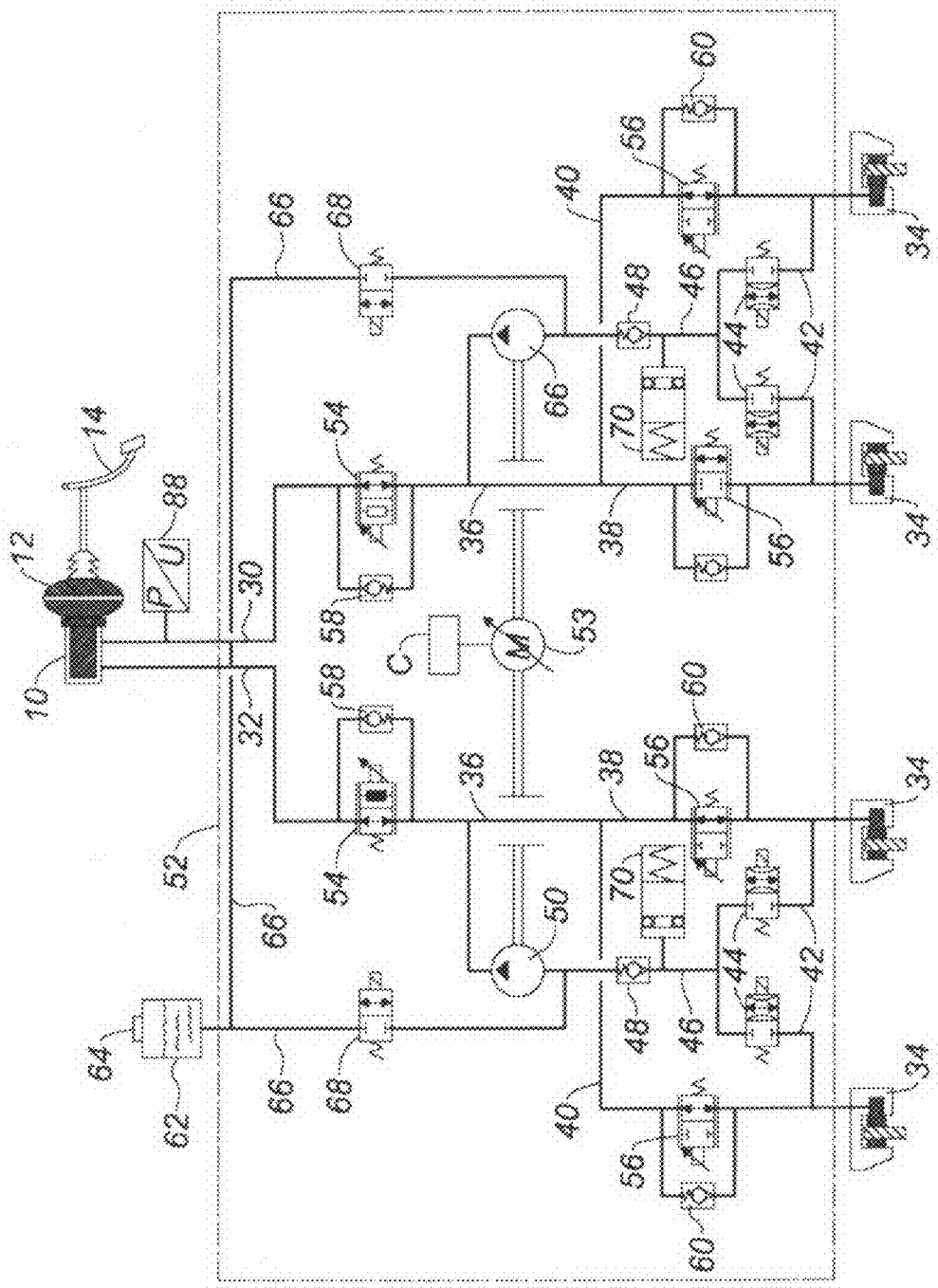
FIG. 1 is a schematic representation of a braking installation according to the invention.

The braking installation shown schematically in FIG. 1 comprises a master cylinder 10 linked to a pneumatic brake booster 12 controlled by a brake pedal 14, in the conventional way.

Figure 2:
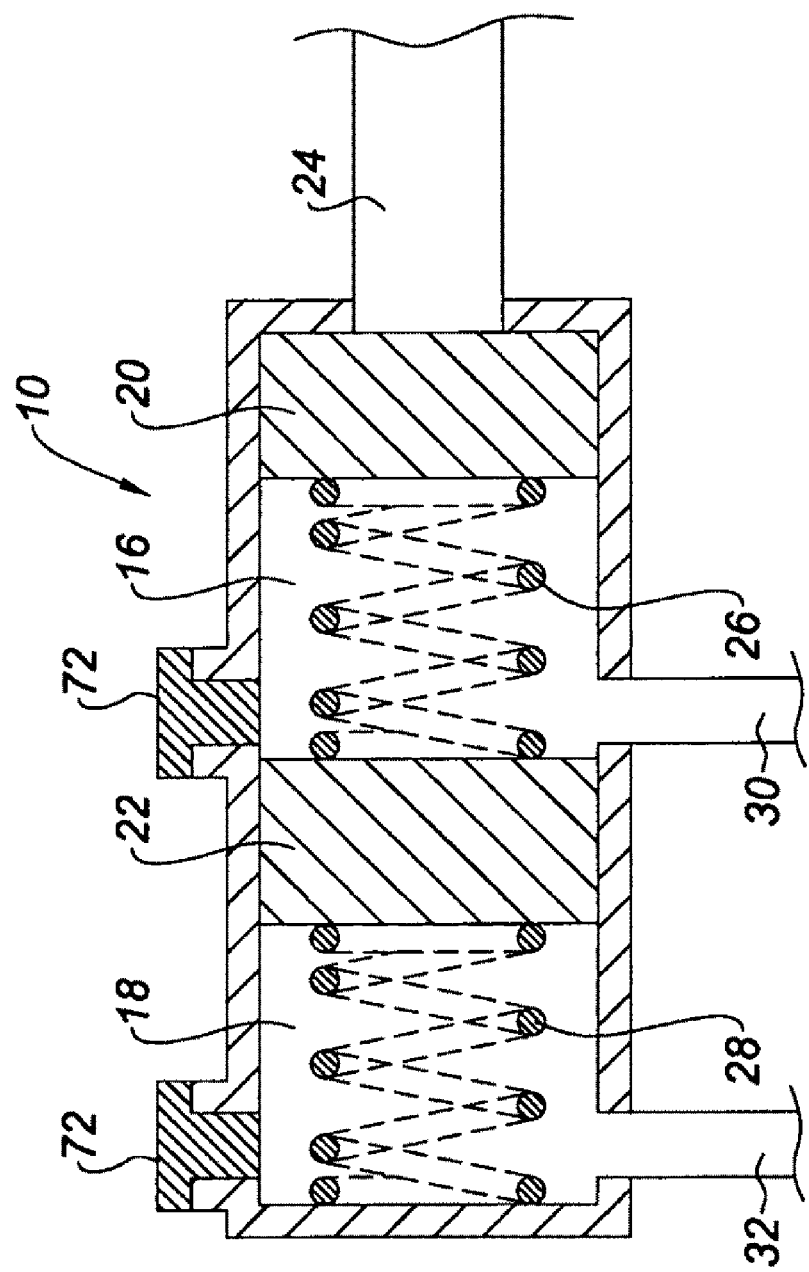
FIG. 2 is a schematic side-elevation of the master cylinder of the installation in FIG. 1.

The master cylinder 10 is a tandem master cylinder shown in detail in FIG. 2, which comprises a primary pumping chamber 16 and a secondary pumping chamber 18 delimited within the body of the master cylinder by a primary piston 20 and a secondary piston 22, the primary piston 20 being linked by a push rod 24 to the pneumatic brake booster 12.

The return springs 26 and 28 are arranged between the primary piston 20 and secondary piston 22 and between the secondary piston 22 and the front extremity of the body of the master cylinder 10. Each pumping chamber 12, 14 is linked by a conduit 30, 32 to the feed circuits of the brakes 34 assembled on the front wheels and rear wheels of the motor vehicle.

Conventionally, the braking installation comprises two separate circuits assembled in parallel, one of which being used to supply two of the wheel brakes 34 from the output conduit 30 of the master cylinder and the other being used to supply the other two wheel brakes 34 from the other output conduit 32 of the master cylinder, these two circuits being identical. To simplify the description, only one of these circuits shall be described below.

Each circuit comprises a feed conduit 36 that links an output conduit 30, 32 of the master cylinder to two parallel conduits 38, 40 each supplying a wheel brake 34. To each feed circuit 38, 40 is attached a return circuit 42 fitted with a solenoid valve 44 and connected via a shared conduit 46 comprising a non-return valve 48 at the inlet of a pump 50 that is part of a hydraulic unit 52 providing wheel fraction control, wheel anti-locking and vehicle drive stability control functions.

This hydraulic unit comprises the two pumps 50 mentioned above, one for each feed circuit for the wheel brakes, these two pumps being driven by a shared motor 54 controlled by a computer C.

In each feed circuit, the output of the pump 50 is connected to the aforementioned feed conduit 36, between a solenoid valve 54 assembled in the output conduit 30, 32 of the master cylinder and two solenoid valves 56 assembled in the conduits 38, 40 supplying the two wheel brakes 34 of the circuit. A non-return valve 58 is connected on a bypass around the solenoid valve 54, in the direction that prevents the backflow of brake fluid to the master cylinder 10, and non-return valves 60 are connected on a bypass around the solenoid valves 56 supplying the wheel brakes, in the direction that prevents the backflow of brake fluid from the wheel brakes.

A brake fluid reservoir 62, of the type comprising a filling cap 64, is fitted to the hydraulic unit 52 and connected via conduits 66 each comprising a solenoid valve 68 at the inlets of the pumps 50 of the hydraulic unit. These solenoid valves 68, like the solenoid valves 44 fitted in the return conduits of the brakes 34, are of the type that are closed in idle state and opened by the computer C.

The solenoid valves 54 and 56 fitted in the feed conduits of the wheel brakes 34 are of the type that are open in idle state and closed by the computer C.

Finally, a brake accumulator 70 is attached to the shared return conduit 46 upstream of the non-return valve 48.

The brake fluid reservoir 62 fitted to the hydraulic unit 52 is only connected to the inlets of the pumps 50 and does not include a connection conduit to the pumping chambers 16, 18 of the master cylinder 10. As shown in FIG. 2, the structure of this master cylinder is significantly more simple than in the prior art, on account of the absence of these connection conduits and the absence of brake fluid passages in the pistons 20 and 22 of the master cylinder and the valves fitted in these passages.

The chambers 16 and 18 of the master cylinder may therefore be filled permanently with brake fluid, pressurized by the forward movement of the pistons 20, 22.

The bleed holes closed by the caps 72 are formed in the body of the master cylinder 10 at the front extremities of the pumping chambers 16, 18.

This braking installation works as follows:

When the braking operation is commanded by the driver pressing on the brake pedal 14, the brake fluid is pressurized in the output conduits 30, 32 of the master cylinder and in the conduits 36, 38, 40 supplying the wheel brakes 34 by moving the pistons 20, 22 of the master cylinder forwards, the response time of the braking circuit being very quick on account of the absence of travel in the master cylinder.

The solenoid valves 54, 56 fitted in the feed conduits of the wheel brakes remain open until they are closed by the computer C.

When the computer C detects a condition in which an action on the wheel brake 34 is required, to prevent the wheel locking or slipping or to stabilize the vehicle, it closes the solenoid valves 54 connecting the master cylinder 10 to the wheel-brake feed circuits 34, and opens one or both of the solenoid valves 68 supplying the pumps 50 from the reservoir 62. The computer C can therefore adjust the pressure of the brake fluid supplying each wheel brake 34 to the required value, to obtain the desired result.

It may also momentarily open the solenoid valves 54 assembled in the output conduits 30, 32 of the master cylinder during operation of the pumps 50, to refill the pumping chamber of the master cylinder with brake fluid, if necessary.

Figure 3:
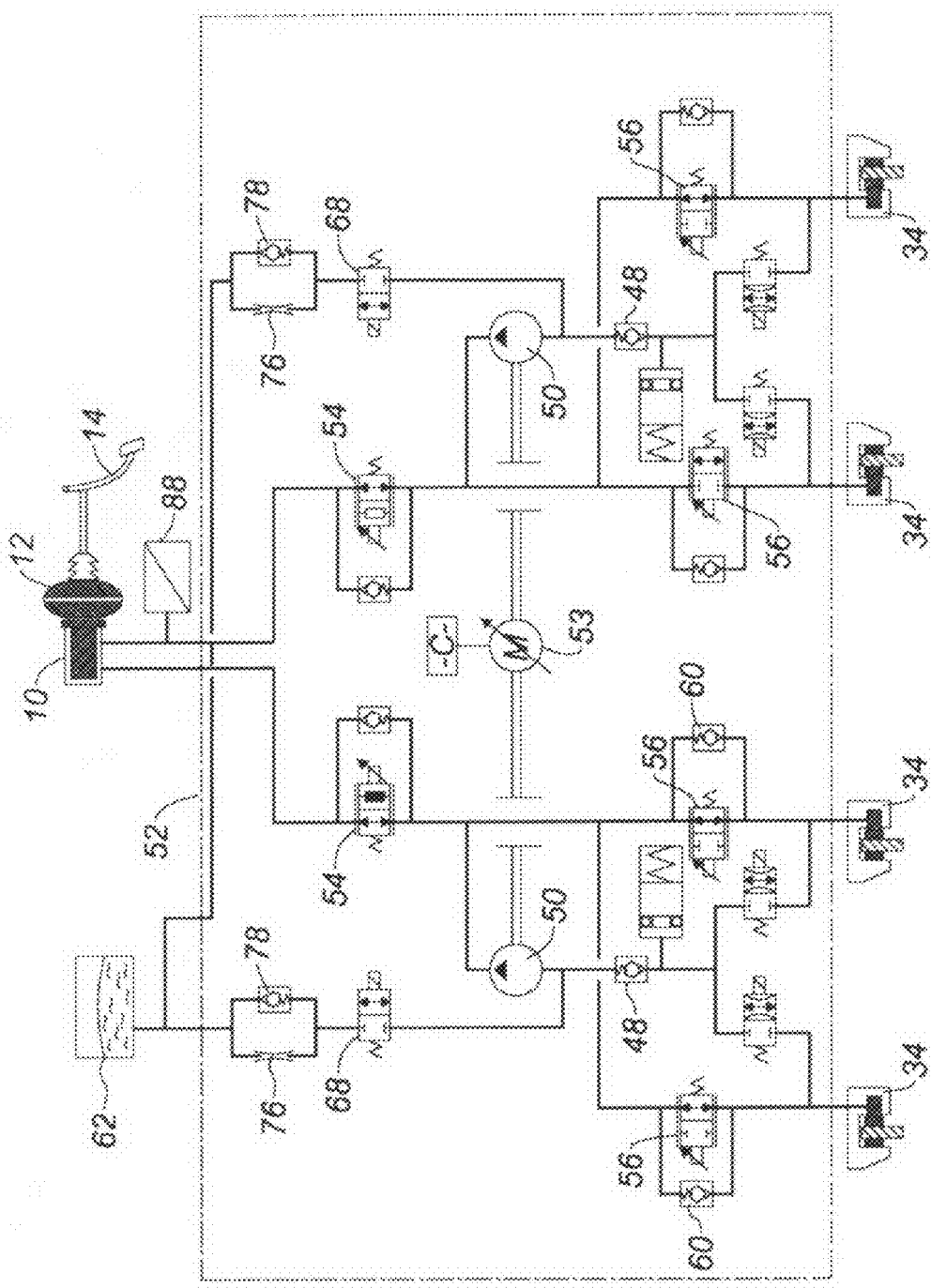
FIGS. 3 and 4 are schematic views of the alternative embodiments of the braking installation according to the invention.

The braking installation according to the invention that is shown in FIG. 3 differs from that shown in FIGS. 1 and 2 in that the brake fluid reservoir 62 does not comprise a filling cap and is sealed closed, this reservoir being connected to each solenoid valve 68 provided for at the inlet of the pump 50 of the hydraulic unit 52 by a unit comprising a calibrated orifice 76 and a non-return valve 78 arranged in parallel, the non-return valve 78 preventing the backflow of brake fluid towards the reservoir 62.

The function of this unit 76, 78 is to enable the unrestricted supplying of each pump 50 at the command of the computer C, the calibrated orifice 76 creating a pressure drop that prevents any excessive and dangerous overpressure in the reservoir 62 when the brake fluid returns to the reservoir, if the pressure in the wheel brakes 34 is too high.

The backflow of brake fluid through the calibrated orifice 76 generates momentary residual braking torque, but guarantees the reservoir 62 against all risk of explosion. In all other respects, the braking installation in FIG. 3 is identical to the one in FIG. 1.

Figure 4:
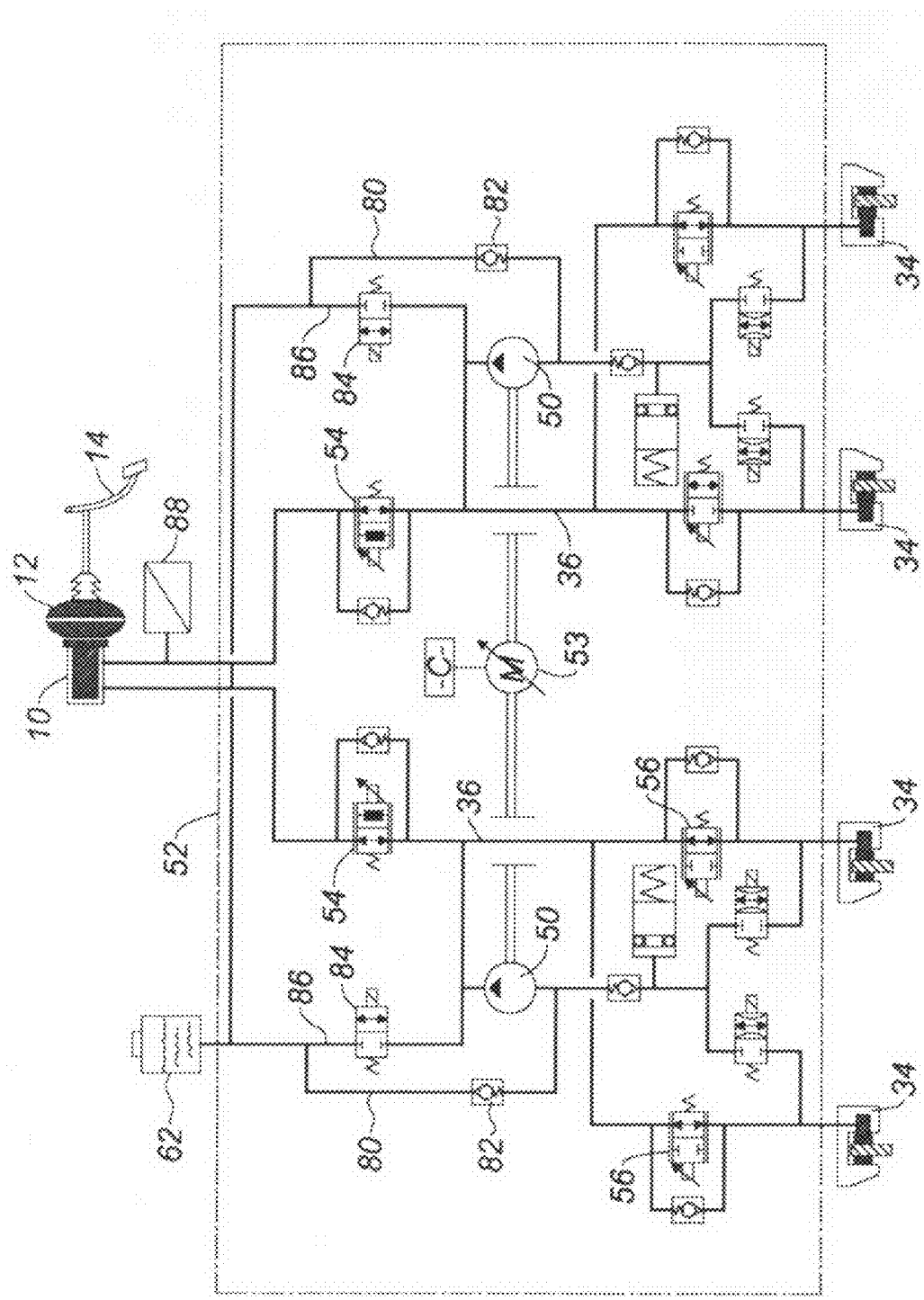

In the alternative embodiment shown schematically in FIG. 4, the braking installation differs from that shown in FIG. 1 in that the brake fluid reservoir 62, fitted to the hydraulic unit 52, is connected to the inlet of each pump 50 by a conduit 80 fitted with a non-return valve 82 fitted in the direction preventing the backflow of brake fluid to the reservoir. A solenoid valve 84 is fitted in a conduit 86 connecting the output of the pump 50 to the reservoir 62. As in the installation in FIG. 1, the output of each pump 50 is connected to the feed conduit 36 of the wheel brakes 34, between the solenoid valve 54 assembled in the corresponding output conduit 30, 32 of the master cylinder and the solenoid valves 56 supplying the wheel brakes. In all other respects, the installation shown in FIG. 4 is identical to the one in FIG. 1.

The solenoid valves 84 fitted in the conduits 86 linking the outputs of the pumps 50 to the reservoir 62 are closed in idle state and opened by the computer C. They enable a backflow of brake fluid towards the reservoir 62, when commanded by the computer.

In the embodiments described and shown in FIGS. 1, 3 and 4, a braking command by the action of the driver on the brake pedal 14 is detected by means of a pressure sensor 88 assembled in one of the output conduits of the master cylinder 10. In an alternative embodiment, this braking command may be detected using the output signal of a position or movement sensor that is linked to the brake pedal 14 and that controls the illumination of the stop lights, i.e. the lamps of the braking signal circuits, when the driver presses on the brake pedal 14 and takes it out of its idle position.

The invention claimed is:

1. Braking installation for a motor vehicle, comprising a brake fluid reservoir (62) a master cylinder (10) controlled by a brake pedal (14) and connected to feed circuits for wheel brakes (34), and a hydraulic unit (52) comprising brake-fluid pressure pumps (50), connected to wheel-brake feed circuits and controlled by a computer C, characterized in that the brake fluid reservoir (62) is linked to inlets of said pumps (50) by first solenoid valves (68) controlled by the computer C, characterized in that the master cylinder (10) is linked to said pumps (50) separate from the brake fluid reservoir (62) and characterized in that a calibrated orifice (76) and a non-return valve (78) are connected in parallel between the reservoir (62) and the inlets of the hydraulic-unit pumps (50).

2. Installation according to claim 1, characterized in that the first solenoid valves (68, 84) are closed in idle state and opened by the computer C.

3. Installation according to claim 2, characterized in that the reservoir (62) is fitted on the hydraulic unit (52).

4. Installation according to claim 3, characterized in that the second solenoid valves (54) controlled by the computer C are assembled in the feed circuits of the wheel brakes (34) between the outputs (30, 32) of the master cylinder and the outputs of the pumps (50).

5. Installation according to claim 4, characterized in that the second solenoid valves (54) are open in idle state and closed by the computer C.

6. Installation according to claim 5, characterized in that the non-return valves (58) are fitted in parallel on the second solenoid valves (54) and prevent the backflow of brake fluid from the wheel brakes to the master cylinder.

7. Installation according to claim 6, characterized in that the master cylinder (10) is a tandem master cylinder with two pumping chambers (16, 18) and two pistons (20, 22) not fitted with valves.

8. Installation according to claim 1, characterized in that second solenoid valves (54) controlled by the computer C are assembled in the feed circuits of the wheel brakes (34) between outputs (30, 32) of the master cylinder and outputs of the pumps (50).

9. Installation according to claim 8, characterized in that the second solenoid valves (54) are open in idle state and closed by the computer C.

10. Installation according to claim 9, characterized in that non-return valves (58) are fitted in parallel on the second solenoid valves (54) and prevent the backflow of brake fluid from the wheel brakes to the master cylinder.

11. Installation according to claim 1, characterized in that the reservoir (62) is fitted on the hydraulic unit (52).

12. Installation according to claim 1, characterized in that the master cylinder (10) is a tandem master cylinder with two pumping chambers (16, 18) and two pistons (20, 22) not fitted with valves.

13. Installation according to claim 1, wherein the brake fluid reservoir is connected to pump inlets and the master cylinder is connected to the pump outputs.

* * * * *